(12) United States Patent
Agarwal

(10) Patent No.: US 8,347,255 B2
(45) Date of Patent: Jan. 1, 2013

(54) EQUATION BASED RETARGETING OF DESIGN LAYOUTS

(75) Inventor: Kanak Behari Agarwal, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 287 days.

(21) Appl. No.: 12/782,407

(22) Filed: May 18, 2010

(65) Prior Publication Data

US 2011/0288671 A1      Nov. 24, 2011

(51) Int. Cl.
*G06F 17/50* (2006.01)
(52) U.S. Cl. .................. 716/122; 716/110; 716/123
(58) Field of Classification Search .......... 716/122, 716/123, 110
See application file for complete search history.

(56) References Cited

U.S. PATENT DOCUMENTS

| | | | |
|---|---|---|---|
| 6,189,132 B1 | 2/2001 | Heng et al. | |
| 6,753,115 B2 | 6/2004 | Zhang et al. | |
| 7,174,520 B2* | 2/2007 | White et al. | 716/136 |
| 7,272,542 B1 | 9/2007 | Sanders | |
| 7,418,693 B1 | 8/2008 | Gennari et al. | |
| 7,437,691 B2 | 10/2008 | Tang et al. | |
| 7,448,012 B1 | 11/2008 | Qian | |
| 7,490,308 B2 | 2/2009 | Gonzalez et al. | |
| 2008/0178140 A1 | 7/2008 | Lin et al. | |
| 2009/0178018 A1 | 7/2009 | Torres Robles et al. | |
| 2009/0241087 A1* | 9/2009 | Zhang et al. | 716/21 |
| 2010/0180251 A1* | 7/2010 | Ye et al. | 716/19 |
| 2010/0218156 A1* | 8/2010 | Pierrat | 716/11 |
| 2011/0119642 A1* | 5/2011 | Agarwal et al. | 716/50 |
| 2011/0124193 A1* | 5/2011 | Cheng et al. | 438/669 |
| 2011/0138342 A1* | 6/2011 | Agarwal | 716/50 |
| 2011/0161907 A1* | 6/2011 | Cheng et al. | 716/119 |
| 2011/0204470 A1* | 8/2011 | Cheng et al. | 257/499 |

OTHER PUBLICATIONS

IBM; Pre-Si Estimation and Compensation of SRAM Layout Deficiencies to Improve Design Yield, ip.com, Dec. 11, 2007.
Chu et al; Nonrectangular Shaping and Sizing of Soft Modules for Floorplan-Design Improvement, IEEE Transactions on Computer-Aided Design of Integrated Circuits and Systems, Jan. 2004, vol. 23, No. 1, 71-79, USA.
Invarium; Challenges in Double Patterning, Feb. 26, 2007, 1-65.

* cited by examiner

*Primary Examiner* — Stacy Whitmore
*Assistant Examiner* — Magid Dimyan
(74) *Attorney, Agent, or Firm* — Garg Law Firm, PLLC; Rakesh Garg; Eustus Nelson

(57) ABSTRACT

A method, system, and computer usable program product for equation based retargeting of design layouts are provided in the illustrative embodiments. A set of desirable combination of values of a set of layout parameters of the design layout is determined. A desirable region that includes the set of the desirable combination of values is determined. An equation is computed to determine a retargeting value for a first combination of values of the set of layout parameters with respect to the desirable region. Instructions are generated to adjust a value in the first combination to generate a second combination of values of the set of layout parameters such that the second combination falls in the desirable region. A shape in the design layout is retargeted such that the retargeted shape uses the second combination of values of the set of layout parameters. The IC is manufactured using the retargeted shape.

20 Claims, 6 Drawing Sheets

US 8,347,255 B2

EQUATION BASED RETARGETING OF DESIGN LAYOUTS

BACKGROUND OF THE INVENTION

1. Field of the Invention

The present invention relates generally to an improved integrated circuit design system, and in particular, to a method for modifying an integrated circuit design for manufacture. Still more particularly, the present invention relates to a method, system, and computer usable program code for equation based retargeting of design layouts.

2. Description of the Related Art

Modern day electronics include components that use integrated circuits (ICs). Integrated circuits are electronic circuits formed using Silicon as a substrate and by adding impurities to form solid-state electronic devices, such as transistors, diodes, and resistors. Commonly known as a "chip", an integrated circuit is generally encased in hard plastic. The components in modern day electronics generally appear to be rectangular black plastic pellets with connector pins protruding from the plastic encasement.

Circuit designers use a variety of software tools to design and test electronic circuits that accomplish an intended task. For example, a digital circuit may be designed to accept digital inputs, perform some computation, and produce a digital output. An analog circuit may be designed to accept analog signals, manipulate the analog signals, such as my amplifying, filtering, or mixing the signals, and produce an analog or digital output. Generally, any type of circuit can be designed as an IC.

Once a design layout, also referred to simply as a layout, has been finalized for an IC, the design is converted into a set of masks for lithography. A set of masks for lithography is one or more masks for lithography. During manufacture, a Silicon wafer is exposed to light or radiation through a set of masks to form microscopic components of the IC.

A layout includes shapes that the designer selects and positions to achieve a design objective. The objective is to have the shape—the target shape—appear on the wafer as designed. However, the shapes may not appear exactly as designed when manufactured on the wafer through photolithography. For example, a rectangular shape with sharp corners may appear as a rectangular shape with rounded corners on the wafer.

SUMMARY OF THE INVENTION

The illustrative embodiments provide a method, system, and computer usable program product for equation based retargeting of design layout. In an application executing in a data processing system, an embodiment determines a set of desirable combination of values of a set of layout parameters of the design layout. The embodiment determines a desirable region including the set of the desirable combination of values. The embodiment computes an equation to determine a retargeting value for a first combination of values of the set of layout parameters with respect to the desirable region. The embodiment generates instructions to adjust a value in the first combination to generate a second combination of values of the set of layout parameters such that the second combination falls in the desirable region. The embodiment retargets a shape in the design layout to form a retargeted shape such that the retargeted shape uses the second combination of values of the set of layout parameters. An embodiment may manufacture the IC using the retargeted shape.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
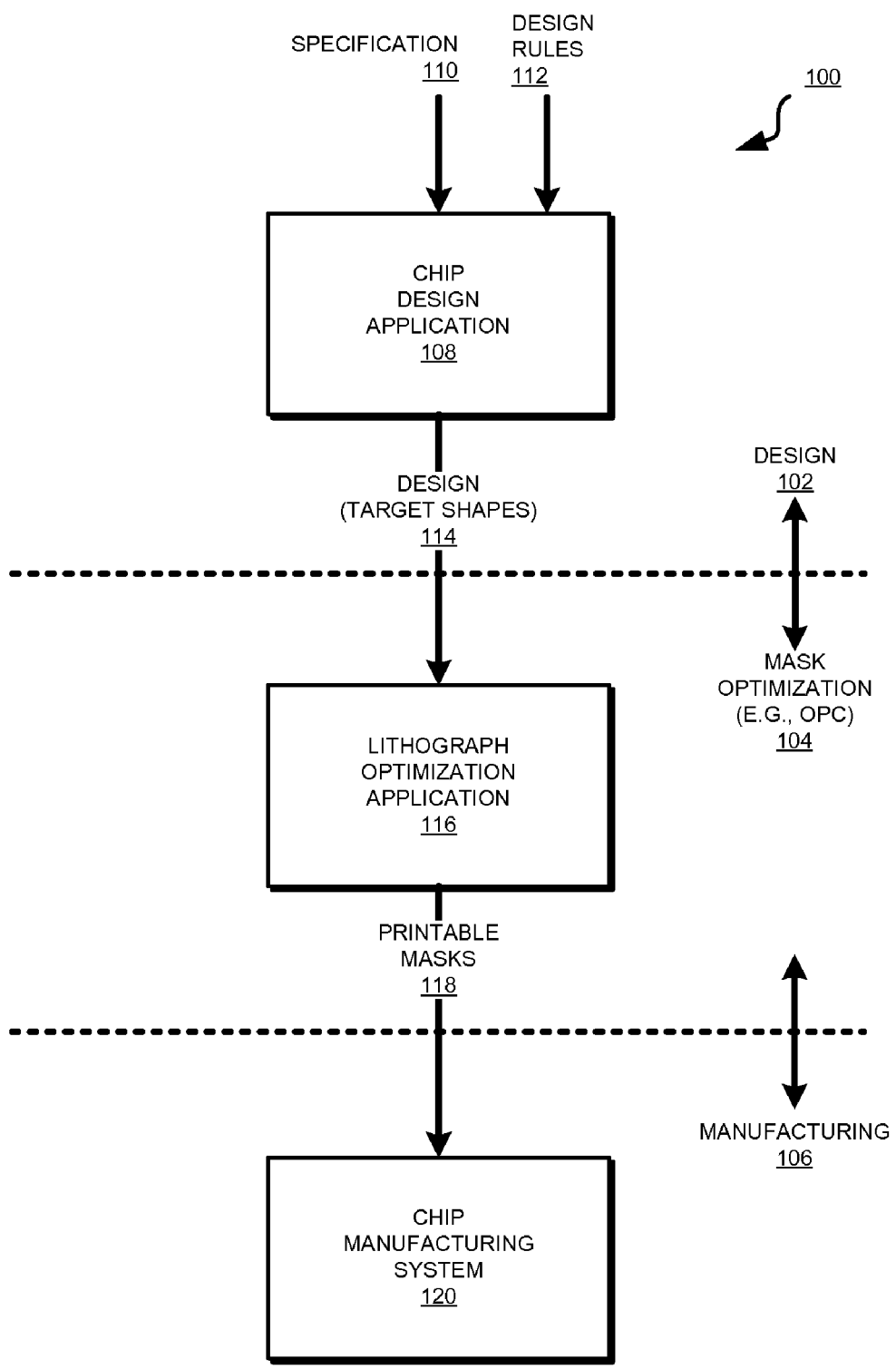
FIG. 1 depicts a block diagram of an IC design process in which the illustrative embodiments may be implemented.

A layout of an IC has to conform to certain design rules. For example, a design rule may specify that a component cannot exceed a specified size, or be within a specified distance of another specified component. A layout that conforms to all the applicable design rules is called a design rule clean layout.

At manufacturing, however, a design rule clean layout may not be producible on a wafer for a variety of reasons. For example, light may diffuse to cause a sharp corner of a shape in a mask to appear rounded on the wafer. To correct for manufacturing idiosyncrasies, optical distortion, distance limitations, and other manufacturing considerations the shapes in a layout may be adjusted. Presently, a process called mask optimization, which may include optical proximity correction (OPC), is utilized to make changes to a mask so that the mask can compensate for manufacturing limitations.

Conventionally, the shaped provided by a designer have been used as the shapes for lithography. However, the invention recognizes that with the ever-reducing size of IC components and the increasing number of components per unit area, the designer provided shapes are becoming increasingly difficult to reproduce on wafer.

The illustrative embodiments used to describe the invention address and solve these and other problems related to printing shapes of a layout in photolithography. The illustrative embodiments provide a method, computer usable program product, and an apparatus for equation based retargeting of design layouts.

An adjustment to achieve a new target shape that corresponds to the original target shape but has comparatively better printability on a wafer is called retargeting. Retargeting modifies the shapes provided by the designer to generate new target shapes that have improved printability.

Retargeting according to an embodiment is different from mask optimization. Present mask optimization process changes the mask for manufacturability and not the target layout. Retargeting according to an embodiment changes the shapes that are used to produce the mask.

The invention recognizes that some techniques for retargeting presently exist but such techniques are fraught with other problems. For example, a rule based retargeting method employs simple one or two dimensional retargeting rules to modify shapes that are known to cause difficulties at the manufacturing stage. For example, a rule based retargeting method may include a retargeting rule that for a given pitch and width of a component M1, bias the metal shapes by x nanometers. Another example rule in rule based retargeting may be that if a notch is of size y nanometers, fill the notch by z nanometers.

The invention recognizes that rule based retargeting suffers from several limitations. For example, all possible poor manufacturability conditions have to be known a priori to create corresponding retargeting rules. However, the invention recognizes that such knowledge is not always available and therefore the rules created are limited in the conditions they can correct, leaving certain layout conditions uncorrected.

The invention further recognizes that a rule has to be created for each enumerated condition requiring retargeting. The set of rules can become extremely large and complex. The large and complex set of rules is not easy to implement, manage, change, or correct for errors.

Furthermore, certain conditions cannot effectively be converted into rules. Such conditions either go unaddressed in a rule based retargeting method, or an inadequately addressed by bucketing with other conditions. Bucketing is the process of applying a set, or bucket, of rules to a set of conditions as a whole. Accordingly, some conditions are better addressed by a bucket of rules than other conditions addressed by the same bucket of rules. Application of the rules is choppy and not continuous over the range of conditions that may require retargeting. Moreover, rules are inadequate where retargeting value depends on more than two layout parameters. Typical rules are one or two dimensional and can not cover the multi-dimensional layout space.

Another existing retargeting technique is called model based retargeting. Model based retargeting retargets shapes during mask optimization iterations. In other words, the retargeting operation is included with the mask optimization operation so that the retargeting is done as a part of the iterations of the mask optimization process.

The invention recognizes that mask optimization itself is a computationally intensive process. Including retargeting steps in the mask optimization process causes the mask optimization process to consume even more time and computing resources.

Furthermore, the results of retargeting in model based retargeting are not predictable in advance. The retargeting results from mask optimization iterations cannot be made available to the designer in advance. Accordingly, a designer cannot evaluate whether or not a retargeted shape is acceptable within other design considerations.

An embodiment of the invention provides a middle path between the rule based retargeting approach and a model based retargeting approach. An embodiment improves coverage of retargeting over rule based retargeting, while reducing the complexity of retargeting over the model based retargeting. An embodiment improves the accuracy of retargeting over the rule based retargeting method while imposing less runtime overhead as compared to the model based retargeting method.

The examples in this disclosure are used only for the clarity of the description and are not limiting on the illustrative embodiments. Additional operations, actions, tasks, activities, and manipulations will be conceivable from this disclosure and the same are contemplated within the scope of the illustrative embodiments.

The illustrative embodiments are described using specific code, data structures, designs, layouts, schematics, and tools only as examples and are not limiting on the illustrative embodiments. The illustrative embodiments may be implemented with respect to other similarly purposed code, data structures, designs, layouts, schematics, and tools within the scope of the invention.

Furthermore, the illustrative embodiments may be described in some instances using particular systems, applications, or architectures only as an example for the clarity of the description. The illustrative embodiments may be used in conjunction with other comparable or similarly purposed systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

With reference to FIG. 1, this figure depicts a block diagram of an IC design process in which the illustrative embodiments may be implemented. Process 100 can be loosely divided into three stages, namely, design stage 102, mask optimization stage 104 where, for example mask optimization may be performed, and manufacturing stage 106.

Chip design application 108 may be a software application usable for creating shapes in a design layout. Application 108 may accept design specification 110 as an input, which may specify a goal to be accomplished by the design layout. Design rules 112 may be a set of design rules.

A set of rules is one or more rules. A set of design rules is one or more design rules. Rules 112 may or may not include rules for rule based retargeting.

Using specification 110 and a subset of design rules 112, application 108 may produce design 114. Design 114 may include a set of shapes—the set of target shapes. A set of shapes is one or more shapes. A set of target shapes is one or more target shapes.

Design 114 including a set of target shapes is provided to mask optimization (OPC) stage 104. Mask optimization application 116 may be a software application configured to generate a set of masks suitable for manufacturing design 114 on wafer.

Application 116 may execute any number of mask optimization iterations to optimize or modify one or more mask shapes. Application 116 may or may not include instructions for model based retargeting. Application 116 provides a set of mask shapes, or masks, to manufacturing stage 106. Masks 118 is such a set of masks.

Chip manufacturing system 120 uses masks 118 to produce one or more patterns on a wafer. The patterns so produced accomplish the objectives specified in specification 110. A shape created on the wafer may be retargeted and may not be similar to the corresponding target shape in design 114.

Figure 2:
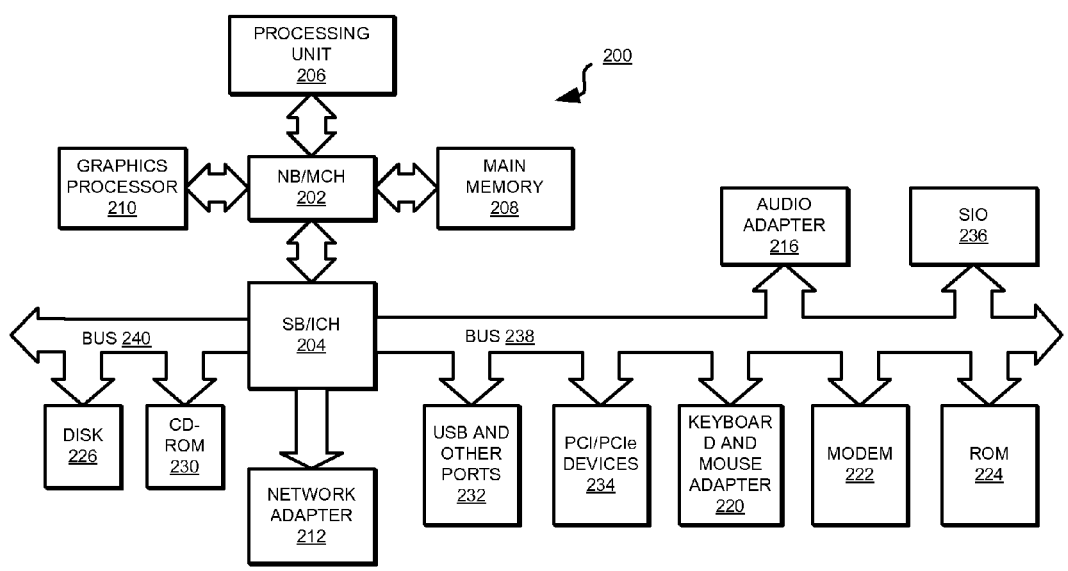
FIG. 2 depicts a block diagram of a data processing system in which illustrative embodiments may be implemented.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft° Windows® (Microsoft and Windows are trademarks of Microsoft Corporation in the United States and other countries), or Linux° (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware and software in FIGS. 1-2 may vary depending on the implementation. Other internal hardware or peripheral devices, such as flash memory, equivalent non-volatile memory, or optical disk drives and the like, or other comparable software or firmware may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
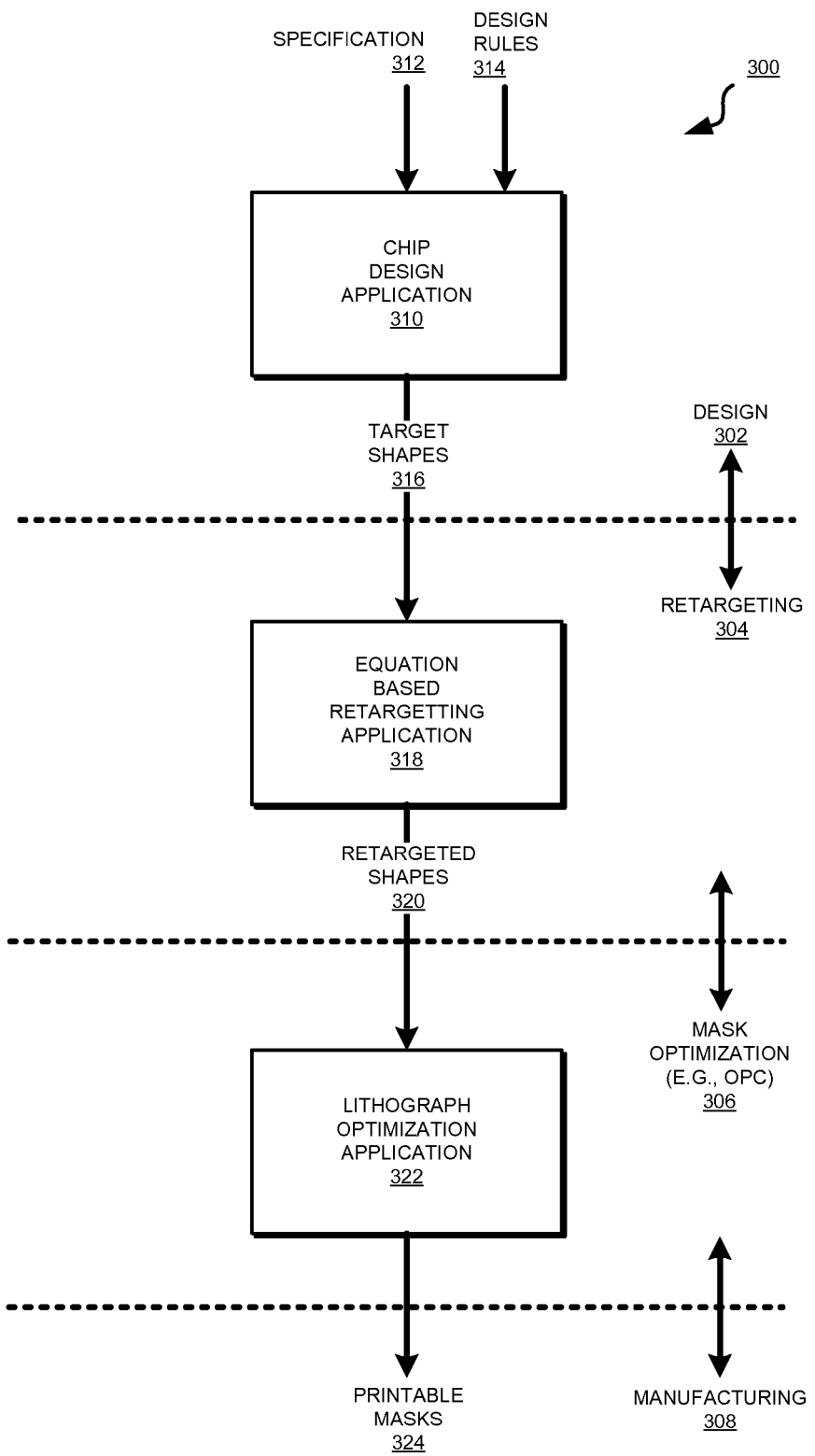
FIG. 3 depicts a block diagram of an IC design process including equation based retargeting in accordance with an illustrative embodiment.

With reference to FIG. 3, this figure depicts a block diagram of an IC design process including equation based retargeting in accordance with an illustrative embodiment. Process 300 can be loosely divided into four stages, namely, design stage 302, retargeting stage 304, mask optimization (OPC) stage 306, and manufacturing stage 308. Design stage 302, mask optimization stage 306, and manufacturing stage 308 may be similar to design stage 102, mask optimization stage 104, and manufacturing stage 106 respectively in FIG. 1.

Chip design application 310 may operate in a manner similar to application 108 in FIG. 1. Specification 312 and design rules 314 may be similar to specification 110 and design rule 112 respectively in FIG. 1. Target shapes 316 may be similar to target shapes included in design 114 in FIG. 1.

Retargeting stage 304 may include an embodiment of the invention in equation based retargeting application 318. In one embodiment, equation based retargeting application 318 may operate as a distinct step after the design process is complete and before the mask optimization process is executed.

Application 318 outputs a set of retargeted shapes. Retargeted shapes 320 is such a set. Retargeted shapes 320 may include retargeted shapes for some or all of target shapes 316. Retargeted shapes 320 are provided to mask optimization application 322, which may produce set of masks 324 as described in FIG. 1.

Retargeting stage 304 is depicted as a distinct stage only for the clarity of the description and is not a limitation on the invention. For example, in one implementation, retargeting stage 304 may be an extension of either design stage 302 or mask optimization stage 306 within the scope of the invention. For example, in one embodiment, equation based retargeting application 318 may be configured to operate with chip design application 310. In another embodiment, equation based retargeting application 318 may be configured to operate with a mask optimization process, such as in mask optimization application 322.

Equation based retargeting according to an embodiment determines a continuous relationship between an amount of retargeting and a set of layout parameters. A layout parameter is a feature, measurement, limitation, constraint, dimension, specification, or another aspect in the layout. A set of layout parameters is one or more layout parameter.

Generally, any factor affecting a layout can be used as a layout parameter. For example, any aspect of a layout or a component therein that is alterable during retargeting can be a layout parameter within the scope of the invention. For example, width of components may be an example layout parameter. Spacing between components in the layout may be another example layout parameter.

A continuous relationship can be plotted as a continuous n-dimensional surface in an n-dimensional graph, where n is the number of layout parameters in the set. In an embodiment, a first continuous relationship may exist between the n parameters, where n may be the number of layout parameters in the set. For example, the relationship may be depicted in an n-dimensional space and desirable relationship contours in the n-dimensional space may identify the desirable relationship values or combinations for the n parameters.

In one embodiment, retargeting value "R" according to the invention may be an n-tuple where n is the number of layout parameters in the set. In another embodiment the retargeting value may be an (n−x) tuple, (n−x) being the number of parameters to be retargeted in a subset of the set of parameters. A second continuous relationship may exist between the retargeting value such that the retargeting value is depicted in the $(n+1)^{st}$ dimension and the second relationship is capable of being depicted in the n+1 dimensional space. Accordingly, a continuous relationship between retargeting value and a set of layout parameters is a relationship such that for any given values of layout parameters in a set of layout parameters, the relationship equation can provide corresponding desirable values, or retargeting values, for one or more layout parameters in the set.

A continuous relationship is distinct from a discrete relationship in that a discrete relationship provides corresponding retargeting values at only certain discrete values of layout parameters in the set. Typically, discrete relationships are implemented as rules, which then provide choppy or bucketed coverage for retargeting layout shapes.

Figure 4:
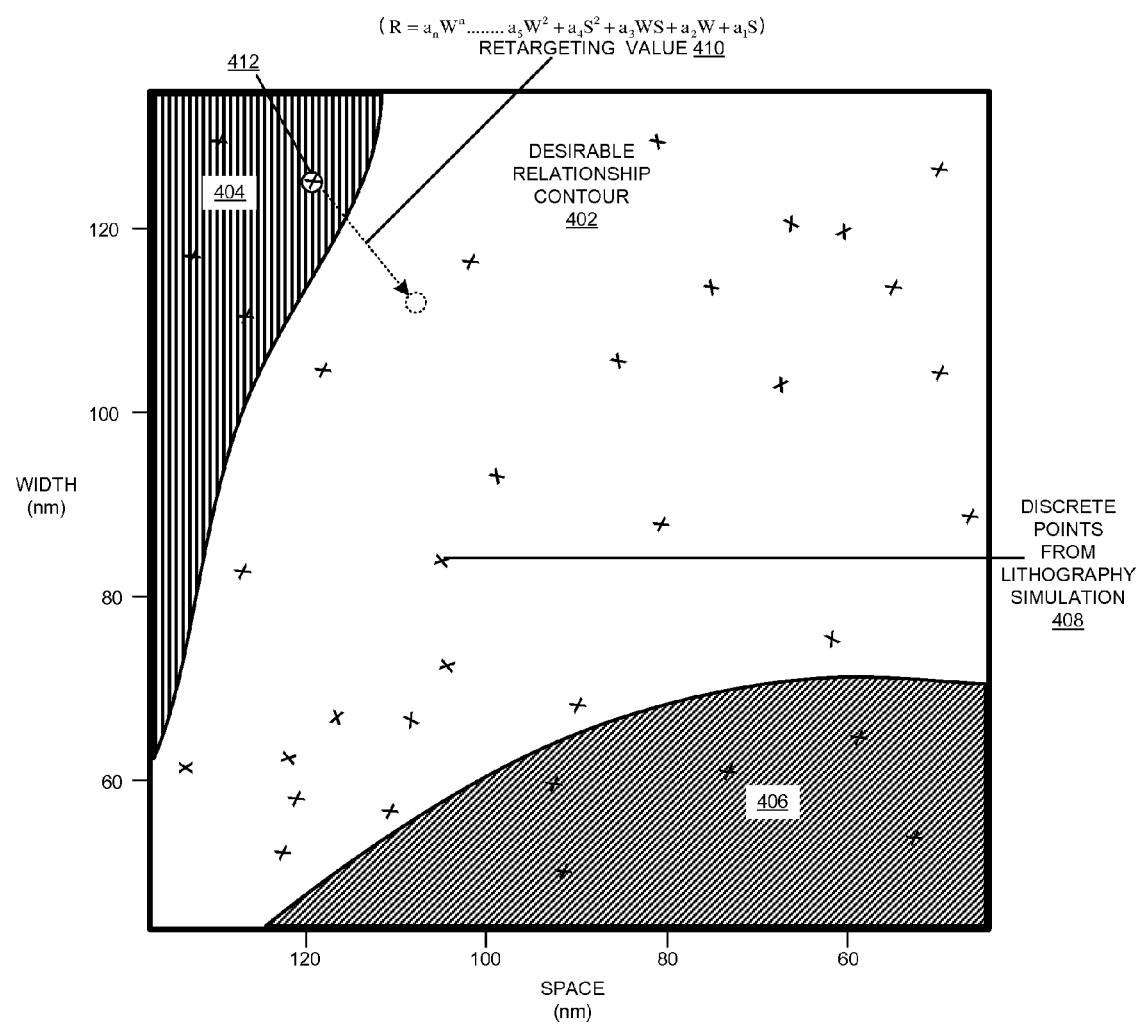
FIG. 4 depicts a graph of a continuous relationship between two example layout parameters in accordance with an illustrative embodiment.

With reference to FIG. 4, this figure depicts a graph of a continuous relationship between two example layout parameters in accordance with an illustrative embodiment. Region 402 represents the desirable region and regions 404 and 406 in the graph represent the combinations of the two layout parameters that may be undesirable. This relationship between the layout parameters enables determining an amount of retargeting for one or more layout parameters given the values of one or more layout parameters in a set of parameters. Graph 400 may be produced, used, or implied by the computations implemented in an equation based retargeting application, such as application 318 in FIG. 3. The equation based retargeting application according to an embodiment determines a polynomial equation that determines a retargeting value according to graph 400 such that undesirable layout parameter combinations from region 404 and 406 are moved to the desirable region 402.

Only as a simple example to describe the operation on an embodiment, graph 400 is plotted as a two-dimensional graph using two example layout parameters, viz, spacing and width of components in a layout. Graph 400 is generated from experimentation or simulation using an example layout. For example, an example layout having similar component densities, composition, scale, and complexity as a design to be manufactured may be used to produce graph 400.

For example, for a given width and spacing in the target shapes, the retargeting relationship may allow determining a retargeting of the width by a retargeting value which is determined by an equation which is a function of width and spacing. As an example, the example relationship between the width and the spacing parameters can be represented as two dimensional contours or graph where the X and Y axes are width and spacing values. A retargeting value "R" according to an embodiment, gives the amount of retargeting needed for a given parameter such that after retargeting, the relationship of layout parameters comes within the desirable contours or regions.

Note that an embodiment does not require that the actual design having the actual shapes that are to be manufactured be used for producing the graph and the corresponding equation. An example layout may be used to determine the polynomial retargeting equation. The equation can then be converted into computational instructions and used to retarget shapes in actual production layouts.

In operation, a simulation using an example layout generates points representing corresponding values of the set of layout parameters being plotted. The simulation may be executed for generating any number of such points. For example, in depicted graph 400, certain points are shown at which the simulation is performed. Each point corresponds to a particular combination of width and spacing.

Of such values, the desirable combinations of the width and spacing parameters are noted as the discrete desirable points in the relationship between the width parameter and the spacing parameter. For example, desirable combination of the width and spacing parameter values may lie in region 402. Points lying in regions 404 and 406 may represent undesirable combinations of the width and spacing values.

A set of such desirable points may be obtained through sufficient simulation, the set including two or more points, if required, a set of undesirable points may also be obtained in a similar manner. Point 408 is an example member of such a set of desirable points in example graph 400. The size of the set of discrete desirable points may be any size suitable for a particular implementation and may be achieved through suitable number of simulations within the scope of the invention. For example, a two dimensional contour for retargeting based on just two parameters may require fewer points to generate as compared to an 8-dimension surface that connects the desirable 8-tuples in an 8-dimension graph.

Region 402 may be a desirable relationship contour or region in the space of graph 400. In one embodiment, region 402 may be more than one region in graph 400, forming a set of desirable relationship contours. Desirable relationship contour 402 is one or more continuous curve, either open or closed, that represents the desirable relationships between the example width and spacing parameters. In an n-dimensional space, where the desirable relationships between n layout parameters is plotted, contour 402 may take an n-dimensional form within the scope of the invention.

Equation 410 represents the equation that, for any point in graph 400, such as point 412, answers the question—which parameter should be retargeted by what retargeting value such that the point moves within one of desirable relationship contour 402. The value "R" provided by the equation for given values of W and S for a given point 412 in graph 400 represents the retargeting of that point such that the point falls on or within (one or more of) desirable relationship contour 402.

Example equation 410 is a polynomial function of two variables only as an example. For an n-axes plot, equation 410 may be a polynomial equation in n variables within the scope of the invention.

Once equation 410 is determined, the retargeting value for any point in graph 400 can be determined. If a point is already within a desirable relationship contour, the equation returns a retargeting value that is below a threshold. For example, R may be zero or a negligible value. On the other hand, if a point is not on or within a desirable relationship contour, the equation returns a value of R that is above a threshold.

The equation can then be implemented in an equation based retargeting application. The retargeting application accepts a design including a set of target shapes. The retargeting application determines whether for a shape in the design, a parameter or a combination of parameters that participates in the equation is outside the desirable relationship contours. The retargeting application then determines a retargeting value R according to the equation. The retargeting application can then adjust one or more parameters for that shape, such that the combination of the adjusted values of the set of parameters falls on or within at least one of the desirable relationship contours.

Figure 5:
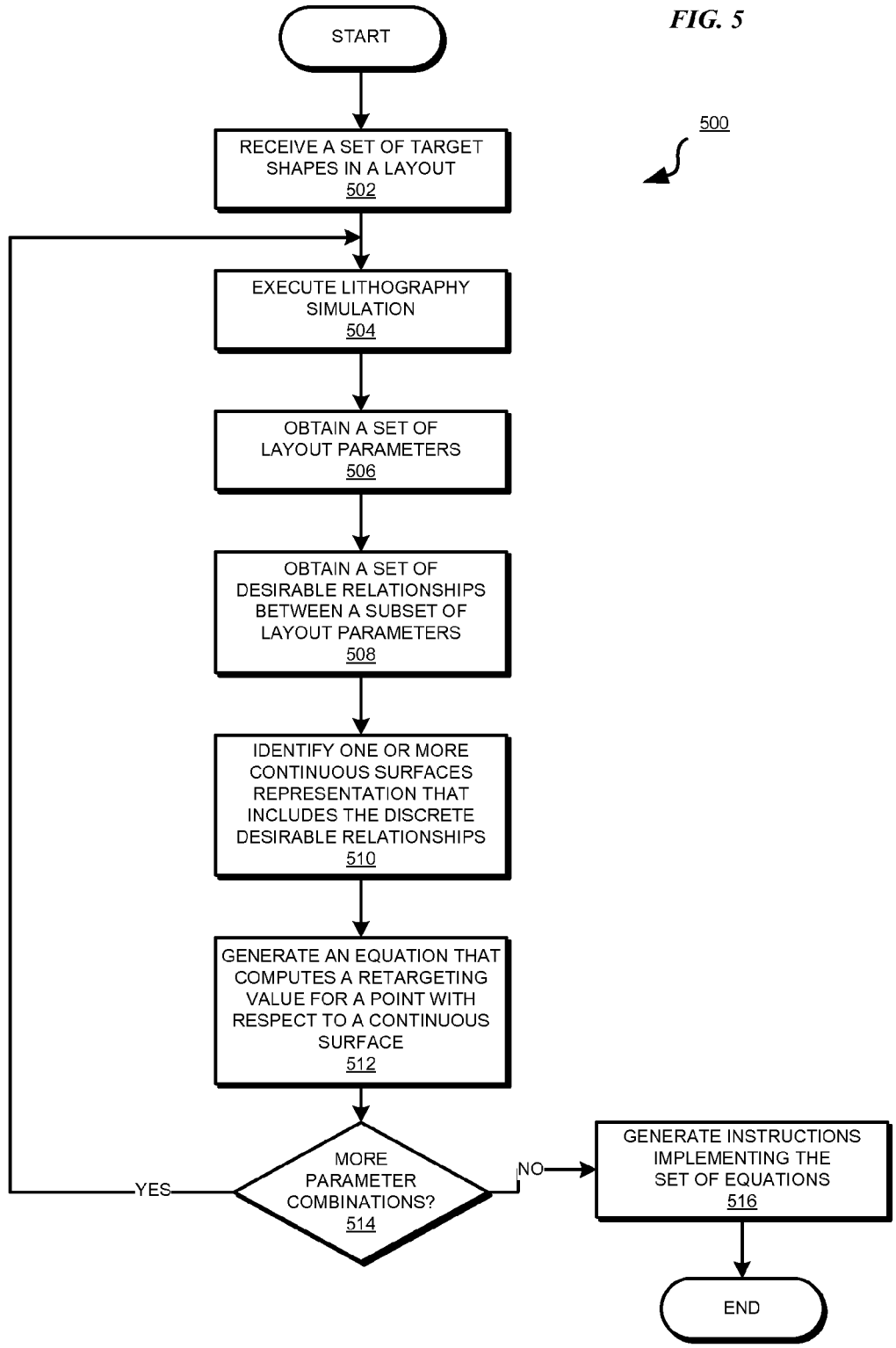
FIG. 5 depicts a flowchart of a process of equation based retargeting in accordance with an illustrative embodiment.

With reference to FIG. 5, this figure depicts a flowchart of a process of equation based retargeting in accordance with an illustrative embodiment. Process 500 may be implemented in an equation based retargeting application, such as equation based retargeting application 318 in FIG. 3.

Process 500 begins by receiving a set of target shapes in a layout (step 502). Process 500 executes a lithography simulation (step 504).

Process 500 obtains a set of layout parameters (step 506). In one embodiment, the set of layout parameters may be specified prior to the simulation, such as when certain parameters are preferred for retargeting. In another embodiment, the set of parameters may be an output of the simulation, such as when the simulation indicates which parameters may be effective in retargeting within the specified constraints. Not all the layout parameters in the set of layout parameters may necessarily be used to compute the equation according to an embodiment. Process 500 obtains a set of desirable relationships between a subset of the layout parameters (step 508).

Process 500 identifies one or more continuous surface representations or regions that include the discrete desirable relationship points (step 510). Desirable relationship contours 402 in FIG. 4 is an example of such one or more continuous surfaces in two dimensions. The continuous surfaces of step 510 may be in any number of dimensions without limitations.

Process 500 determines an equation that computes a retargeting value for a discrete point in the n dimensional layout space with respect to a continuous surface, such as the desirable region, in the space (step 512). The retargeting value represents the retargeting of one or more parameters to bring the discrete point on or within at least one of the continuous surfaces.

Process 500 determines whether additional combinations of the layout parameters have to be examined (step 514). If additional combinations of layout parameters have to be examined ("Yes" path of step 514), process 500 returns to step 504. If no additional layout parameter combination has to be plotted ("No" path of step 514), process 500 generates the instructions to implement the equation (step 516). In one embodiment, process 500 may generate a set of equations, such as for different combinations of layout parameters. A set of equations is one or more equations. In such a case, process 500 may generate instructions for the set of equations in step 516. Process 500 ends thereafter.

Figure 6:
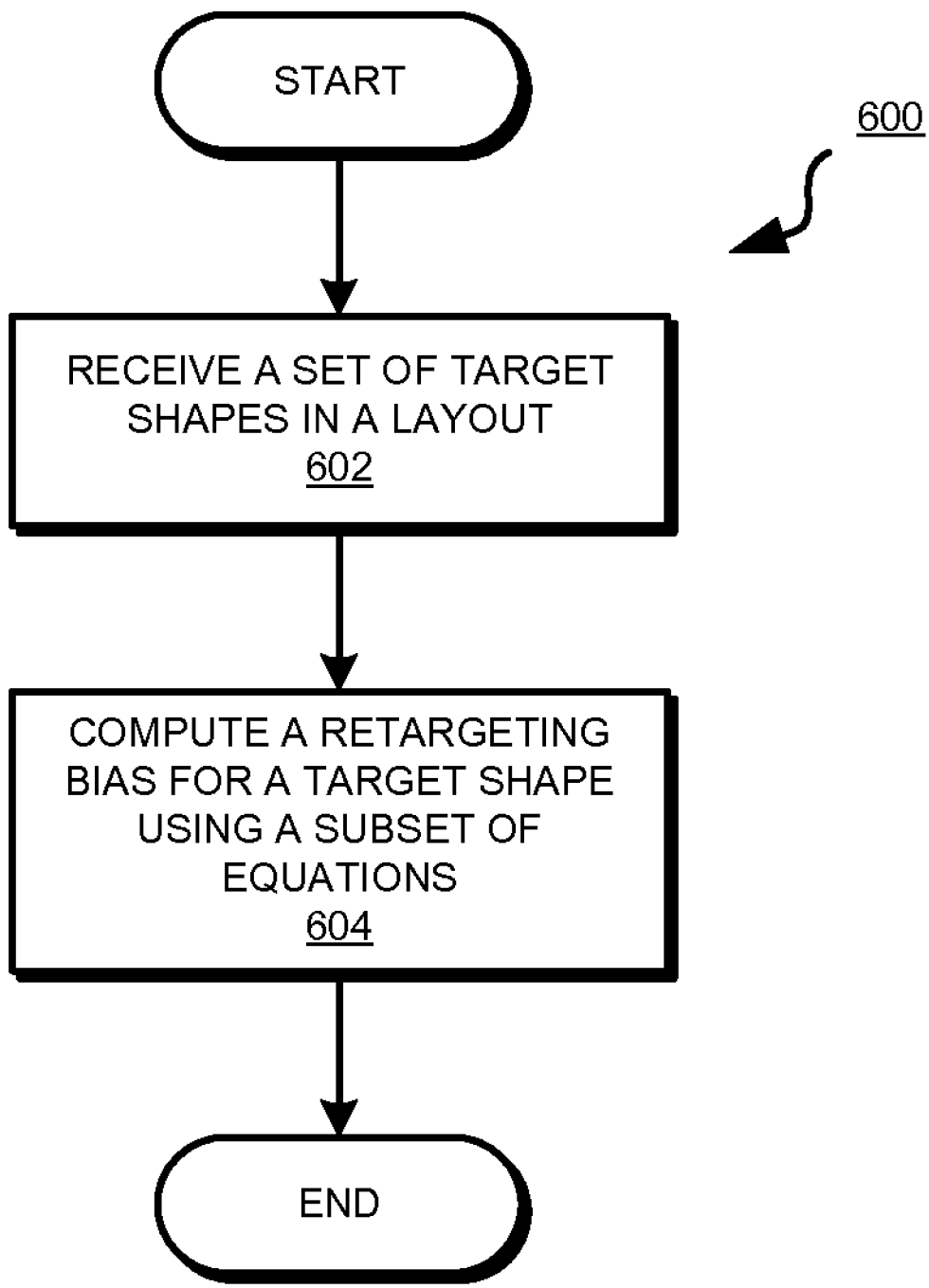
FIG. 6 depicts a flowchart of a process of equation based retargeting in accordance with an illustrative embodiment.

With reference to FIG. 6, this figure depicts a flowchart of a process of equation based retargeting in accordance with an illustrative embodiment. Process 600 may be implemented in an equation based retargeting application, such as equation based retargeting application 318 in FIG. 3.

Process 600 begins by receiving a set of target shapes in a layout (step 602). Process 600 computes a retargeting bias for a target shape using a subset of the equations, such as the set of equations generated in process 500 in FIG. 5 (step 604). In one embodiment, process 600 may repeat step 604 for several iterations. Process 600 produces a retargeted shape for the layout and ends thereafter.

The components in the block diagrams, the equations, and the steps in the flowcharts described above are described only as examples. The components, the equations, and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, a computer implemented method, apparatus, and computer program product are provided in the illustrative embodiments for equation based retargeting of design layouts. By using one or more illustrative embodiments of the invention, one or more shapes in a given design layout can be retargeted more accurately as compared to a rule based retargeting method while incurring less cost as compared to a model based retargeting method. The retargeted shapes can be made available to designers for verification before masks are produced from the retargeted layout.

The invention can take the form of an entirely software embodiment, or an embodiment containing both hardware and software elements. In a preferred embodiment, the invention is implemented in software or program code, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A method for equation based retargeting of a design layout of an integrated circuit (IC), the method comprising:
    determining from a set of combinations of values, a subset of combinations of values, each combination of values in the set corresponding to a set of layout parameters of the design layout, the subset of combinations of values forming desirable combinations of values such that when the set of layout parameters take one the desirable combinations of values the design layout results in a photolithographic mask that prints the integrated circuit according to a specification and when the set of layout parameters take another combination of values that is not a desirable combination of values, the design layout results in the photolithographic mask that does not print the integrated circuit according to the specification;
    determining a contour that includes the desirable combinations of values;
    computing an equation to determine a retargeting value for a value in a first combination of values from the set of combinations of values such that the first combination of values does not lie within the contour;
    generating instructions to form a second combination of values by adjusting the value in the first combination such that the second combination of values lies within the contour;
    retargeting, in an application executing in a data processing system, a shape in the design layout to form a retargeted shape such that the retargeted shape uses the second combination of values for the set of layout parameters; and
    manufacturing the IC using the retargeted shape.

2. The computer implemented method of claim 1, wherein the set of desirable combinations of values is determined using a second design layout, further comprising:
    performing a lithography simulation using the second design layout to determine a third combination of values corresponding to the set of layout parameters;
    determining whether the third combination of values is a member of the desirable combinations of values according to the specification; and
    using the third combination of values as a desirable combination of values for the set of layout parameters in the design layout.

3. The computer implemented method of claim 1, wherein the set of layout parameters includes more than three layout parameters, the contour is plottable in more than three dimensions, and the equation is in more than three variables.

4. The computer implemented method of claim 1, further comprising:
    determining from a second set of combinations of values a second subset of combinations of values, each combination of values in the second set corresponding to a second set of layout parameters of the design layout, the second subset of combinations of values forming second desirable combinations of values corresponding to the second set of layout parameters of the design layout;
    determining a second contour that includes the second desirable combinations of values;
    computing a second equation to determine a retargeting value for a value in a fourth combination of values from the second set combinations of values such that the fourth combination of values does not lie within the second contour;
    generating instructions to form a fifth combination of values by adjusting the value in the fourth combination such that the fifth combination of values lies within the second contour; and
    using the equation and the second equation in retargeting the shape.

5. The computer implemented method of claim 1, wherein the retargeted shape is obtained prior to producing the photolithographic mask to print the integrated circuit.

6. The computer implemented method of claim 1, wherein a first layout parameter is a width of a component in the design layout, and a second layout parameter is a spacing between two components in the design layout.

7. The computer implemented method of claim 1, wherein the instructions are executed in conjunction with a chip design application that produced the design layout.

8. A computer usable program product comprising a computer usable storage device including computer usable code for equation based retargeting of a design layout of an integrated circuit (IC), the computer usable code comprising:
    computer usable code for determining from a set of combinations of values, a subset of combinations of values, each combination of values in the set corresponding to a set of layout parameters of the design layout, the subset of combinations of values forming desirable combinations of values such that when the set of layout parameters take one the desirable combinations of values the design layout results in a photolithographic mask that prints the integrated circuit according to a specification and when the set of layout parameters take another combination of values that is not a desirable combination of values, the design layout results in the photolithographic mask that does not print the integrated circuit according to the specification;
    computer usable code for determining a contour that includes the desirable combinations of values;
    computer usable code for computing an equation to determine a retargeting value for a value in a first combination of values from the set of combinations of values such that the first combination of values does not lie within the contour;
    computer usable code for generating instructions to form a second combination of values by adjusting the value in the first combination such that the second combination of values lies within the contour;
    computer usable code for retargeting, in an application executing in a data processing system, a shape in the design layout to form a retargeted shape such that the retargeted shape uses the second combination of values for the set of layout parameters; and computer usable code for manufacturing the IC using the retargeted shape.

9. The computer usable program product of claim 8, wherein the set of desirable combinations of values is determined using a second design layout, further comprising:

computer usable code for performing a lithography simulation using the second design layout to determine a third combination of values corresponding to the set of layout parameters;

computer usable code for determining whether the third combination of values is a member of the desirable combinations of values according to the specification; and computer usable code for using the third combination of values as a desirable combination of values for the set of layout parameters in the design layout.

10. The computer usable program product of claim 8, wherein the set of layout parameters includes more than three layout parameters, the contour is plottable in more than three dimensions, and the equation is in more than three variables.

11. The computer usable program product of claim 8, further comprising:

computer usable code for determining from a second set of combinations of values a second subset of combinations of values, each combination of values in the second set corresponding to a second set of layout parameters of the design layout, the second subset of combinations of values forming second desirable combinations of values corresponding to the second set of layout parameters of the design layout;

computer usable code for determining a second contour that includes the second desirable combinations of values;

computer usable code for computing a second equation to determine a retargeting value for a value in a fourth combination of values from the second set combinations of values such that the fourth combination of values does not lie within the second contour;

computer usable code for generating instructions to form a fifth combination of values by adjusting the value in the fourth combination such that the fifth combination of values lies within the second contour; and computer usable code for using the equation and the second equation in retargeting the shape.

12. The computer usable program product of claim 8, wherein the retargeted shape is obtained prior to producing the photolithographic mask to print the integrated circuit.

13. The computer usable program product of claim 8, wherein a first layout parameter is a width of a component in the design layout, and a second layout parameter is a spacing between two components in the design layout.

14. The computer usable program product of claim 8, wherein the instructions are executed in conjunction with a chip design application that produced the design layout.

15. The computer usable program product of claim 8, wherein the computer usable code is stored in a computer readable storage medium in a data processing system, and wherein the computer usable code is transferred over a network from a remote data processing system.

16. The computer usable program product of claim 8, wherein the computer usable code is stored in a computer readable storage medium in a server data processing system, and wherein the computer usable code is downloaded over a network to a remote data processing system for use in a computer readable storage medium associated with the remote data processing system.

17. A data processing system for equation based retargeting of a design layout of an integrated circuit (IC), the data processing system comprising:

a storage device including a storage medium, wherein the storage device stores computer usable program code; and a processor, wherein the processor executes the computer usable program code, and wherein the computer usable program code comprises:

computer usable code for determining from a set of combinations of values, a subset of combinations of values, each combination of values in the set corresponding to a set of layout parameters of the design layout, the subset of combinations of values forming desirable combinations of values such that when the set of layout parameters take one the desirable combinations of values the design layout results in a photolithographic mask that prints the integrated circuit according to a specification and when the set of layout parameters take another combination of values that is not a desirable combination of values, the design layout results in the photolithographic mask that does not print the integrated circuit according to the specification;

computer usable code for determining a contour that includes the desirable combinations of values;

computer usable code for computing an equation to determine a retargeting value for a value in a first combination of values from the set of combinations of values such that the first combination of values does not lie within the contour;

computer usable code for generating instructions to form a second combination of values by adjusting the value in the first combination such that the second combination of values lies within the contour;

computer usable code for retargeting, in an application executing in a data processing system, a shape in the design layout to form a retargeted shape such that the retargeted shape uses the second combination of values for the set of layout parameters; and computer usable code for manufacturing the IC using the retargeted shape.

18. The data processing system of claim 17, wherein the set of desirable combinations of values is determined using a second design layout, further comprising:

computer usable code for performing a lithography simulation using the second design layout to determine a third combination of values corresponding to the set of layout parameters;

computer usable code for determining whether the third combination of values is a member of the desirable combinations of values according to the specification; and computer usable code for using the third combination of values as a desirable combination of values for the set of layout parameters in the design layout.

19. The data processing system of claim 17, wherein the set of layout parameters includes more than three layout parameters, the contour is plottable in more than three dimensions, and the equation is in more than three variables.

20. The data processing system of claim 17, further comprising:

computer usable code for determining from a second set of combinations of values a second subset of combinations of values, each combination of values in the second set corresponding to a second set of layout parameters of the design layout, the second subset of combinations of values forming second desirable combinations of values corresponding to the second set of layout parameters of the design layout;

computer usable code for determining a second contour that includes the second desirable combinations of values;

computer usable code for computing a second equation to determine a retargeting value for a value in a fourth combination of values from the second set combinations of values such that the fourth combination of values does not lie within the second contour;

computer usable code for generating instructions to form a fifth combination of values by adjusting the value in the fourth combination such that the fifth combination of values lies within the second contour; and computer usable code for using the equation and the second equation in retargeting the shape.

* * * * *